United States Patent Office 3,181,674
Patented May 4, 1965

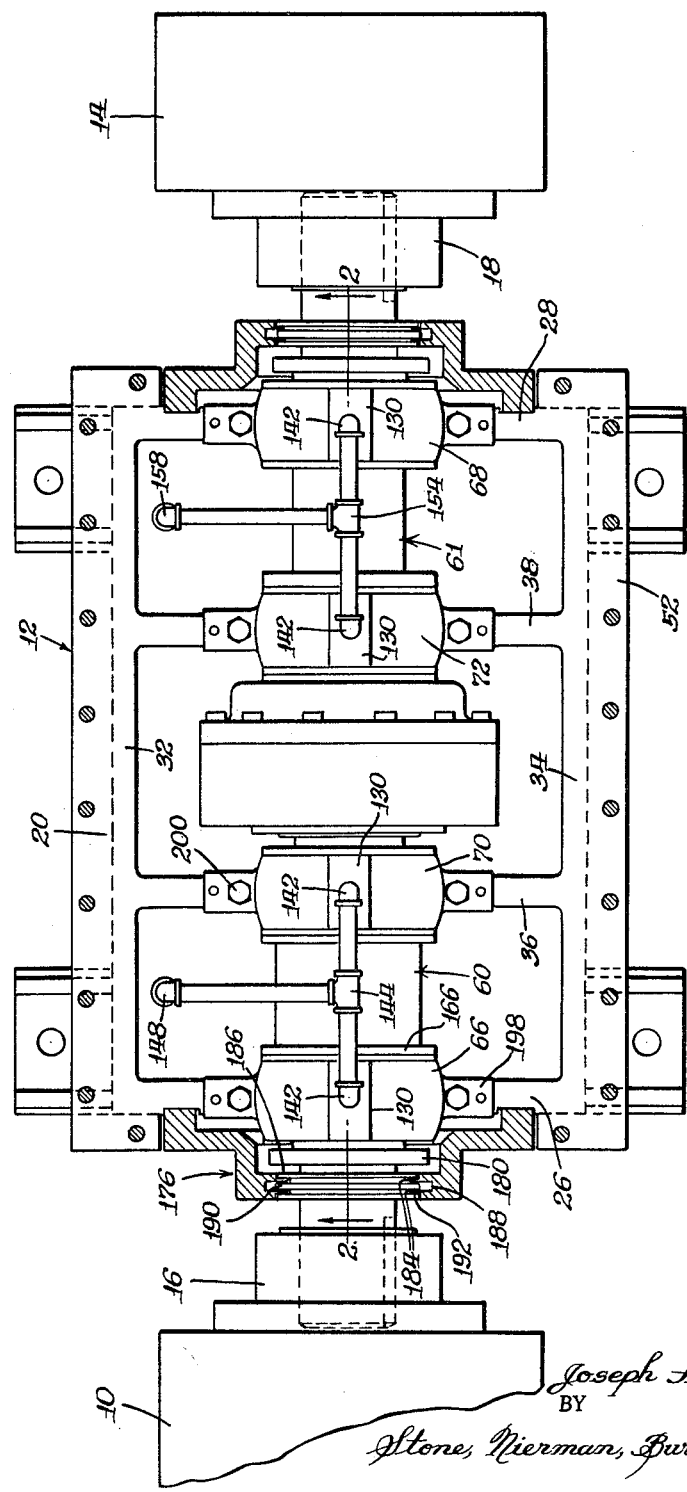

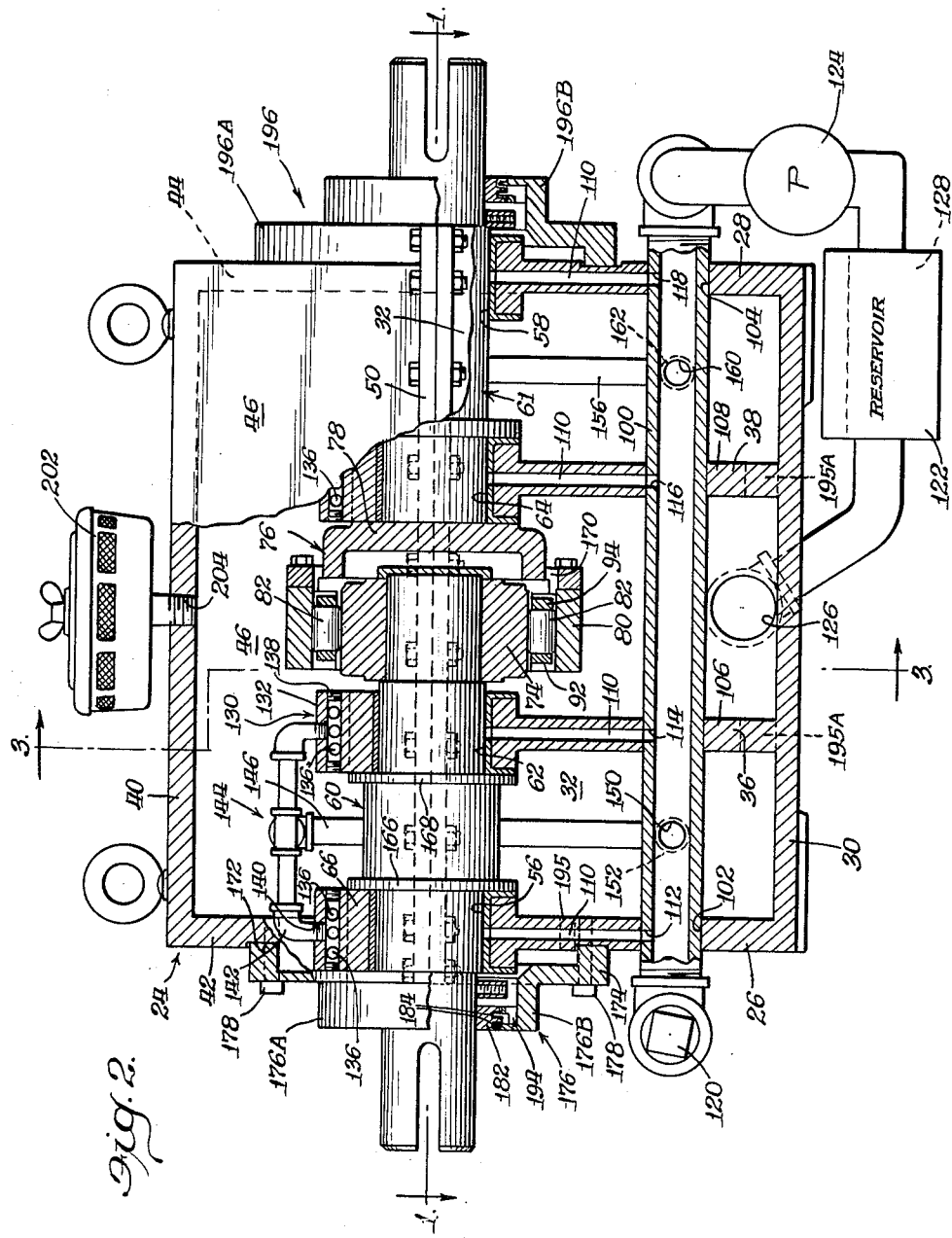

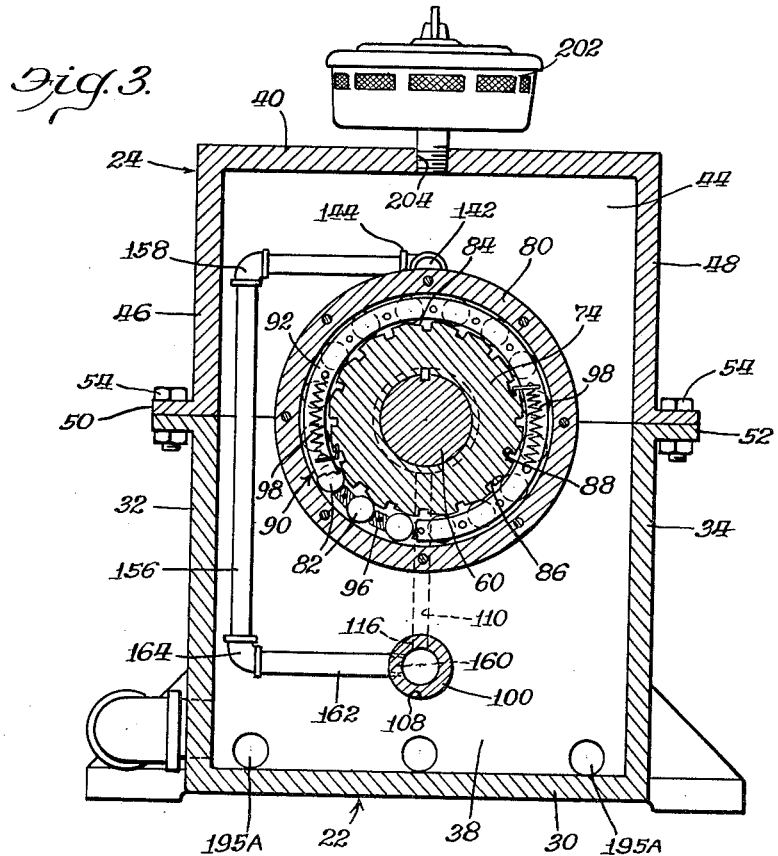
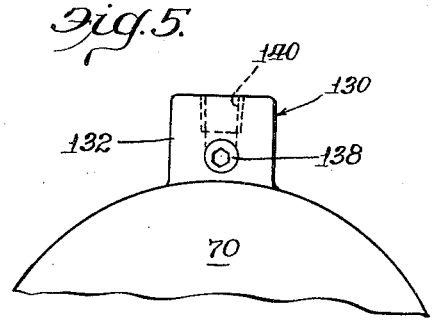
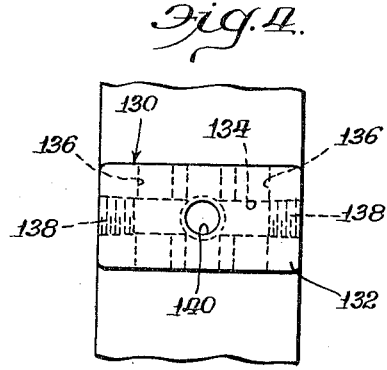

3,181,674
ONE-WAY CLUTCH, BEARING, AND
COOLING MEANS THEREFOR
Joseph A. Marland, P.O. Box 308, La Grange, Ill.
Filed Feb. 26, 1962, Ser. No. 175,589
11 Claims. (Cl. 192—113)

The present invention relates generally to one-way clutch couplers, and particularly to lubrication systems for one-way clutches.

One-way clutches of both the roller bearing type and the sprag type are known in the art. In both types, driving elements or wedges are disposed between coaxially mounted inner and outer races, and the driving elements become wedged between the races when torque is applied in one direction and disengage when torque is applied in the other direction. In the sprag type of clutch, the driving elements are non-cylindrical in form, and the inner and outer races are cylindrical. In the roller bearing type clutch, either the inner or outer race is provided with indentations forming inclined planes, and the rollers rotate in these indentations in the free wheeling direction and become wedged between the races for rotational torques in the driving direction. Patent No. 2,998,113 of the present inventor is an example of a roller bearing type one-way clutch.

One-way clutches have found many applications in industry. The present invention expands these applications to coupling a starter motor to a gas turbine. After the turbine is operating, the speed of the turbine exceeds that of the starter motor, and the starter motor is de-energized. The one-way clutch thereafter operates in a free wheeling condition as long as the gas turbine remains in operation.

One-way clutch couplers have been used for similar operations in industry before, however, the rotation rate of a gas turbine is very high and results in lubrication requirements beyond the capabilities of prior one-way clutch couplers. When a one-way roller bearing clutch or sprag clutch is operated in free wheeling condition, the driving elements are continuously rotating or slipping relative to one of the races and must be adequately lubricated. On the other hand, excessive quantities of lubrication between the roller bearings or sprags and the races result in the development of oil wedges and increased friction, cooling requirements, and wear.

High speed free wheeling operation of a one-way clutch coupler necessarily generates substantially greater quantities of heat than low speed operation of the one-way clutch coupler. This heat must be dissipated in order to prevent deterioration of the one-way clutch and bearings of the coupler. The conventional solution for excessive lubricant temperature is to water cool the lubricant, but water cooling of clutch lubricant would necessarily result in a much more complex structure and introduces the problems of contamination and water supply which are inherent in water cooled systems.

It is an object of the present invention to provide a one-way clutch coupler capable of operation at higher speeds than the one-way clutches previously known.

It is a further object of the present invention to provide a one-way clutch coupler with an improved lubrication system suitable for operation at high rotation rates, particularly in the free wheeling condition.

Also, it is an object of this invention to provide an improved bearing structure suitable for use with one-way clutches and for high speed operation.

A further object of the present invention is to provide a one-way clutch coupler capable of high speed operation in which the lubrication system provides adequate cooling without requiring a fluid cooling medium in contact with the lubricant in addition to the ambient atmosphere.

It is a further object of the present invention to provide a one-way clutch coupler suitable for use between a gas turbine and its starting motor.

These and further objects of the present invention will become readily apparent and more fully appreciated from a further consideration of this disclosure, particularly when viewed in the light of the drawings, in which:

FIGURE 1 is a horizontal sectional view illustrating a one-way clutch coupler constructed according to the present invention mechanically linking a diagrammatically illustrated power source with a diagrammatically illustrated load, the section of FIGURE 1 being illustrated as line 1—1 in FIGURE 2;

FIGURE 2 is a vertical sectional view taken along the line 2—2 of FIGURE 1;

FIGURE 3 is a vertical sectional view taken along the line 3—3 of FIGURE 2;

FIGURE 4 is a plan view of one of the bearings used in the one-way clutch coupler illustrated in FIGURES 1 through 3; and FIGURE 5 is a fragmentary front elevational view of the bearing structure illustrated in FIGURE 4.

FIGURE 1 illustrates an engine 10 which is coupled to a one-way clutch coupler 12 constructed according to the present invention, and the one-way clutch coupler 12 is coupled to a load 14. The engine 10 may be in the form of an electric motor, a steam engine, a gasoline engine, a diesel engine, or the like. To take full advantage of the present invention, the load 14 should be a high speed load, such as a gas turbine operating continuously at rotation rates of the order of 5000 revolutions per minute and higher. In one particular application in which a gasoline turbine constitutes the load 14, the engine 10 is an electric motor which brings the gasoline turbine up to a rotation rate of approximately 3800 revolutions per minute in order to start the gasoline turbine. A coupler 16 connects the engine 10 to the one-way clutch coupler 12 and a coupler 18 connects the one-way clutch coupler 12 to the load 14.

The one-way clutch coupler 12 has a housing 20, and the housing 20 has a bottom portion 22 and a cover portion 24. The bottom portion 22 has end walls 26 and 28 which extend normally from opposite ends of a bottom 30 and are joined together by side walls 32 and 34 which are disposed normal to the end walls 26 and 28. The bottom portion 22 is also provided with two partitions 36 and 38 which are disposed parallel to the end walls 26 and 28 and divide the bottom portion 22 of the housing 20 into three compartments. The end walls 26 and 28, side walls 32 and 34, and partitions 36 and 38 terminate at their ends opposite the bottom 30 on a common plane which is disposed parallel to the bottom 30 of the housing 20.

The cover portion 24 has a top 40 corresponding to the bottom 30 of the bottom portion 22. End walls 42 and 44 extend normally from the top 40 and align with the end walls 26 and 28 of the bottom portion 22, and side walls 46 and 48 extend between the end walls 42 and 44 and align with side walls 32 and 34 of the bottom portion 22. The cover portion 24 has an outwardly extending flange 50 extending thereabout which abuts with an outwardly extending flange 52 extending from the upper edge of the bottom portion 22, and the flanges 50 and 52 are sealed together by means of bolts 54.

The end walls 26 and 28 of the bottom portion 22 are provided with semicylindrical recesses 56 and 58, respectively, and the recesses have centers disposed on a common axis normal to the end walls 26 and 28. The recess 56 receives a shaft 60, while the recess 58 receives a shaft 61. Partitions 36 and 38 are also provided with semi-cylindrical recesses 62 and 64 which are aligned with the recesses 56 and 58, and the recess 62 also receives the shaft 60 while the recess 64 also receives the shaft 61. A bearing cap 66 is mounted on the end wall 26 confronting the recess 56, and the bearing cap 66 together with the surface of the recess 56 form a bearing journaled about the shaft 60. In like manner, a bearing cap 68 is mounted on the end wall 28 confronting the recess 58, and the bearing cap 68 together with the recess 58 forms a bearing surface journaled about the shaft 61. A bearing cap 70 is mounted on the partition 36 and has a concave semicylindrical surface confronting the recess 62 and forms a circular bearing journaled about the shaft 60. Also, a bearing cap 72 is mounted on the partition 38 and has a concave semicylindrical surface confronting the recess 64 and forms a circular bearing journaled about the shaft 61. The bearing caps 66, 68, 70 and 72 are constructed of material having good thermal conductivity coefficients, such as steel. Since metals generally have good thermal conductivity coefficients, this requirement does not severely limit the materials usable in the bearing caps. The end walls 26 and 28 and partitions 36 and 38 also conduct heat from the bearing structures and should also be constructed of material having a high coefficient of thermal conductivity.

Both of the shafts 60 and 61 terminate between the partitions 36 and 38 and are spaced from each other at their ends. The shaft 60 is keyed within an inner race 74 of a one-way clutch 76. The end of the shaft 61 is secured coaxially to a cup shaped member 78 which is attached to its periphery to an outer race 80 of the one-way clutch 76. The one-way clutch 76 has a plurality of spaced roller bearings 82 disposed between the inner race 74 and the outer race 80 with the axes of the roller bearings 82 parallel to the axes of the inner race and outer race. Each of the roller bearings 82 is disposed within an indentation 84 in the inner race 74, and each indentation 84 has a flat surface 86 disposed at a small acuate angle to the plane tangential to the cylindrical surface of the inner race at the leading edge of the flat surface 86. Each indentation 84 also has a surface 88 which is generally disposed on a radius of the inner race 74 and forms a trailing edge. The roller bearings 82 are free to rotate in their respective indentations 84 when disposed adjacent to the trailing edge 88, but wedge between the flat surface 86 and the outer race when translated from the trailing edge.

The roller bearings 82 are assembled in a cage 90 which includes side rings 92 and 94 and spacers 96 disposed between adjacent roller bearings 82. Each of the spacers 96 has a part cylindrical surface confronting the adjacent roller bearings 82, and each of the spacers 96 is secured at opposite ends to the side rings 92 and 94. A pair of springs 98 are attached at one end to each of the side rings 92 and 94 and at the other end to the inner race 74 in order to spring bias the entire cage 90 in a direction of engagement of the roller bearings 82 between the inner and outer races.

From the foregoing description, it will be apparent that rotation of the shaft 60 by the engine 10 in the clock-wise direction, as viewed in FIGURE 3, causes the roller bearings 82 to wedge between the inner race 74 and the outer race 80 and transmit torque from the inner race 74 to the outer race 80, and hence to the shaft 61. If the shaft 61 is driven at a rate exceeding the rotation rate of the shaft 60, it is apparent that the outer race 80 will rotate at a more rapid rate than the inner race 74, and the roller bearings 82 will be translated to a position adjacent to the trailing edge 88 of the indentations 84, and hence permit the clutch to free wheel.

As illustrated in FIGURES 2 and 3, a tube 100 extends through the bottom portion 22 of the housing 20 parallel to the shafts 60 and 61. The tube 100 is disposed immediately below the shafts 60 and 61, and sealed within openings 102 and 104 in the end walls 26 and 28, respectively. The tube 100 is also sealed within openings 106 and 108 in the partitions 36 and 38, respectively. A channel 110 extends from an aperture 112 in the tube 100 through the end wall 26 to the surface of the recess 56, and an identical channel 110 extends from an aperture 114 in the tube 100 through the partition 36 to the semi-cylindrical bearing surface of the recess 62. In like manner, an identical channel 110 extends from an aperture 116 in the partition 38 to the semicylindrical surface of the recess 64, and an identical channel 110 extends from an aperture 118 in the end wall 28 to the semicylindrical surface of the recess 58. One end of the tube 100 is sealed by a plug 120, and the other end of the tube 100 is connected to a reservoir 122 through a pump 124. The reservoir 122 is in turn connected to an orifice 126 located adjacent to the bottom 30 of the housing 20. The reservoir is partially filled by a body 128 of lubricant, such as oil of medium viscosity, and the pump 124 forces the liquid lubricant into the tube 100 and to the surfaces of the recesses 56, 62, 64 and 58 to lubricate these bearings.

As stated above, a shaft 60 is journaled between the semicylindrical surface of the recess 56 and a semicylindrical surface of the bearing cap 66; and further journaled between the semi-cylindrical surface of the recess 62 and a semi-cylindrical surface of the bearing cap 70. Lubricant reaching the recesses 56 and 62 through the channels 110 is adequate to lubricate these bearing surfaces. In like manner, lubricant reaching the semicylindrical surfaces of the recesses 64 and 58 through the channels 110 is adequate to lubricate the bearing surfaces journaling the shaft 61. These flows of lubricant to the semicylindrical surfaces of the recesses 56, 62, 64 and 58 are, however, not adequate to provide adequate cooling for the bearings or to provide adequate lubrication for the one-way clutch 76. For these reasons, a low velocity cooling oil diverter 130 is provided on each of the bearing caps 66, 68, 70 and 72. Each of the oil diverters 130 is integral with its respective bearing cap, and has a body 132 with an axis of elongation parallel to the shaft 60 or 61. A channel 134 extends through the body 132 of each oil diverter 130 along the axis of elongation thereof, and a plurality of bores 136 extend normally through the channel 134 parallel to each other from those surfaces of the body 132 which are generally parallel to the side walls 32 and 34. The ends of the channel 134 are sealed by plugs 138 and an orifice 140 extends into each of the oil diverters from the upper surface thereof and intersects the channel 134 centrally.

An elbow 142 is sealed within the orifice 140 of the oil diverter of the bearing cap 66, and this elbow is sealed to one of the legs of a T-coupler 144. The other leg of the T-coupler is sealed to an identical elbow 142 sealed with the orifice 140 of the bearing cap 70. The stem of the T-coupler 144 is connected at its end to a down pipe 146 through an elbow 148 connected at its end, and the down pipe 146 is coupled to an aperture 150 in the tube 100 through a pipe 152 and an elbow, not shown.

In like manner, the orifices 140 of the bearing caps 68 and 72 are connected to the legs of a T-coupler 154 through elbows 142. The stem of the T-coupler 154 is connected to a down pipe 156 through an elbow 158, and the down pipe 156 is connected to an aperture 160 in the tube 100 through a pipe 162 and elbow 164.

The pressurized lubricant in the tube 100 flows through the pipe 152 and 162 to the down pipes 146 and 156 to the T-couplers 144 and 154, and hence to the lubricant diverters 130 of the bearing caps 66, 68, 70 and 72. The orifice 140 of each of the lubricant diverters 130, and the elbow 142 disposed therein, form a flow restriction, hence permitting the lubricant flowing through the very large orifice area provided by the bores 136 to flow at a slow velocity and at a substantially atmospheric pressure. The result is that the slow flow of a large volume of lubricant is effective in absorbing substantially larger quantities of heat than can be done with a faster flow of lubricant when it is escaping from intimate contact with the bearing metal surface. Such a faster flow of lubricant in a stream, spray or squirting action diverts away from the bearing metal surface and into the surrounding air space. Thus an excessive amount of heat remains in the bearing shell unabsorbed by oil fluid until self-destructive action occurs in the softened bearing metal. This flow of lubricant is first over the bearing caps 66, 68, 70 and 72, and thereafter on all portions of the coupler unit adjacent to these bearing caps. A portion of the slow flowing lubricant strikes the shafts 60 and 61 and one-way clutch 76, and is sprayed about the housing 20 to form a thin mist or vapor. This thin mist or vapor permeates the interior of the one-way clutch 76 and provides adequate lubrication for the clutch. Lubrication for the clutch 76 is also obtained as a result of oil spray about the perimeter of the portion of the shaft 60 extending between the bearing formed by the recess 62 and bearing cap 70 and the one-way clutch 76.

It is to be noted that an oil retainer ring 166 is disposed about the shaft 60 and mounted on the bearing cap 66 and the portion of the end wall 26 which forms the recess 56. This oil retaining ring 166 impedes the flow of oil from the bearing surface formed by the recess 56 and the bearing cap 66. In like manner, an oil retainer ring 168 is disposed about the shaft 60 and mounted on the bearing cap 70 and portion of the partition 36 forming the recess 62 to confront the oil retaining ring 166 for the same purpose. No such oil retaining ring, however, is mounted on the bearing cap 70 and portion of the partition 36 confronting the one-way clutch 76 so that a substantial spray of lubricant impinges on the one-way clutch and permeates between the inner race 74 and the outer race 80 thereof. It is to be noted that a plurality of bores 170 are disposed in the cap 78 adjacent to the inner surface of the outer race 80 of the one-way clutch 76 for the purpose of permitting lubricant to escape from the interior region between the inner race 74 and the outer race 80.

A circular recess 172 is disposed in the exterior surface of the end wall 26 coaxially about the shaft 60, and a flange 174, which is an outwardly extending integral portion of a hub 176, is disposed within the recess 172. The hub 176 is secured on the end wall 26 by means of bolts 178 which extend through the flange 174 into the end wall 26, and are positioned at intervals about the perimeter of the hub 176. A ring 180 is secured about the shaft 60 by a locking screw and spaced by a small distance from the bearing cap 66 and surface of the end wall 26 forming the recess 56 for the purpose of deflecting lubricant forced from the region between the shaft 60 and the bearing surface toward the hub 176. A labyrinth ring 182 is also secured about the shaft 60 and spaced from the ring 180. The labyrinth ring 182 is provided with a plurality of grooves 184 which extend coaxially about the outer surface thereof.

The hub 176 has a circular opening 186 disposed coaxially about the shaft 60 and accommodating the labyrinth ring 182. A circular groove 188 is disposed in the surface of the circular opening 186 of the hub 176 confronting a ring 190 formed by the adjacent grooves 184 of the labyrinth ring 182. The hub 176 also has a ring 192 extending from the cylindrical surface of the opening 186 into the grooves 184 of the labyrinth ring 182. As is clear from FIGURES 1 and 2, the labyrinth ring 182 and ring 192, and the hub 176 form a serpentine path with right angled turns for lubricant to escape from the interior of the housing 20. Further, the hub 176 is provided with a channel 194, shown in FIGURE 2, between the shaft 60 and the tube 100 which permits lubricant to flow downwardly from the seal formed by the labyrinth ring 182 and the ring 192 of the hub 176, and this lubricant is returned to the lower portion 22 of the housing 20 through a channel 195 extending through the end wall 26 adjacent to the portion of the flange 174 adjacent to the tube 100. Channels 195A also extend through the partitions 36 and 38 to prevent lubricant from collecting in the portions of the housing 20 between the end walls 26 and 28 and the partitions 36 and 38.

In order to prevent the lubricant from impeding rotation of the one-way clutch, by forming wedges of lubricant immediately ahead of the roller bearings 182, all of the lubricant is drained from the lower portion 22 of the housing 20 into the reservoir 122. The pump 124 provides a pressure lubrication system which permits generation of lubricant vapor, but no bodies of lubricant are permitted to develop within the housing 20.

The hub 176 is provided with an upper portion 176A and a lower portion 176B, the separation line for the two portions being on the same plane as the separation line between the upper portion 24 and the lower portion 22 of the housing 20. Further, a hub 196 with an upper portion 196A and a lower portion 196B is disposed about the shaft 61 and mounted on the end walls 28 and 44. This hub is identical to the hub 176. As a result, the upper portions 176A and 196A of the hubs may be removed as a part of the upper portion 24 of the housing to permit access to the interior of the housing 20 for servicing purposes. Further, each of the bearing caps 66, 68, 70 and 72 are provided with flanges 198 which extend from opposite sides thereof and are secured to the end walls 26 and 28 and partitions 36 and 38 by bolts 200. Hence, the shafts may be removed from the housing 20 by removing the bearing caps 66, 68, 70 and 72.

A breather 202 is mounted in an aperture 204 in the top 40 of the upper portion 24 of the housing 20. This breather maintains atmospheric pressure on the interior of the housing 20. It also restricts dust, dirt and moisture from entering into the interior of the housing 20.

The restriction in the oil flow to the oil diverters 130 is necessary to maintain adequate oil pressure in the tube 100 for lubricating the bearing surfaces. This restriction should be as small as possible, that is, the orifice 140 and the effective channel provided thereby should be as great as possible to achieve the largest lubricant flow possible consisting with adequate pressure in the tube 100 for lubricating the bearing surfaces formed by the recesses 54, 62, 64, and 58 and the bearing cap 66, 68, 70 and 72.

From the foregoing disclosure, those skilled in the art will readily devise many improvements and many modifications which are within the intended scope of this invention. It is therefore intended that the scope of this invention be not limited by the foregoing disclosure, but rather only by the appended claims.

The invention claimed is:

1. A bearing structure for a shaft adapted to rotate at high rotation rates comprising means defining a bearing surface adapted to be disposed about the shaft including a member and a bearing cap of material having the thermal conductivity of a metal, said bearing cap being adapted to be disposed above the member, said cap having an exterior surface on the side thereof opposite the bearing surface and being provided with a cavity therein, said cap having an opening extending between the cavity and the exterior surface of the bearing cap, a pressurized source of liquid lubricant in communication with the cavity, said source delivering a flow of liquid lubricant at the exterior surface of the cap at approximately atmospheric pressure.

2. A bearing structure for a shaft adapted to rotate at high rotation rates comprising means defining a bearing surface adapted to be disposed about the shaft including a member and a bearing cap of material having the thermal conductivity of a metal, said bearing cap being adapted to be disposed above the member and having a body protruding thereabove, said body having an exterior surface on the side thereof remote from the bearing surface and being provided with a cavity therein and an opening extending between the cavity and the exterior surface of the bearing cap, a pressurized source of liquid lubricant, means defining a passage communicating with the lubricant source and the bearing surface for conveying liquid lubricant from said source to the bearing surface at a first relatively high pressure, means defining a second passage communicating with the lubricant source and the cavity of the body for conveying liquid lubricant from the source to the cavity including a flow restricting orifice for reducing the pressure of the liquid lubricant to a second pressure lower than the first pressure, the area of the flow restricting orifice being less than the area in the opening in the body, whereby a single source of pressurized liquid lubricant lubricates the bearing surface and provides a slow flow of liquid lubricant at a third and lowest pressure on the exterior surface of the bearing cap to cool the means defining the bearing surface.

3. A bearing structure for a shaft adapted to rotate at high rotation rates comprising the elements of claim 2 in combination with a housing wherein the means defining a bearing surface is disposed within the housing, the housing being provided with an orifice adapted to be below the bearing surface, and the source of liquid lubricant comprises a reservoir adapted to be positioned below and in communication with the orifice, and a pump having an inlet connected to the reservoir and an outlet communicating with the means defining the first and second passages.

4. A bearing structure for a shaft adapted to rotate at high rotation rates comprising a housing having a bottom and a wall extending upwardly therefrom, the bottom having an orifice therein and the wall being constructed of material having the thermal conductivity of a metal and having a part cylindrical surface therein, a bearing cap constructed of material having the thermal conductivity of a metal mounted on the wall confronting the part cylindrical surface of the wall, said bearing cap having a part cylindrical inner surface confronting the part cylindrical surface of the wall and forming therewith a cylindrical bearing surface, said bearing cap also having an outer surface sloping upwardly from the wall, said bearing cap having a body disposed more remote from the wall than the sloping surface thereof, said body being provided with a cavity therein and an opening communicating with the cavity positioned adjacent to the sloping surface of the bearing cap, a reservoir positioned below the orifice in the bottom of the housing and in communication with the orifice, a body of liquid lubricant only partially filling the reservoir, and a pump having an inlet disposed in the reservoir and an outlet, means defining a first passage communicating with the outlet of the pump and the bearing surface for delivering liquid lubricant to the bearing surface at a first high pressure, and means defining a second passage communicating with the outlet of the pump and the cavity of the body including a flow restricting orifice for delivering liquid lubricant to the cavity at a lower second pressure, the area of the flow restricting orifice being less than the area in the opening in the body so that liquid lubricant flows from the opening at a third and lowest pressure.

5. A bearing structure for a shaft adapted to rotate at high rotation rates comprising a housing having a bottom and a wall extending upwardly therefrom, the bottom having an orifice therein and the wall being constructed of material having the thermal conductivity of a metal and having a semicylindrical surface therein, a bearing cap constructed of material having the thermal conductivity of a metal mounted on the wall confronting the semicylindrical surface of the wall, said bearing cap having a semicylindrical inner surface confronting the semicylindrical surface of the wall and forming therewith a cylindrical bearing surface, said bearing cap also having a pair of part cylindrical outer surfaces extending upwardly from the wall, said bearing cap having a body disposed between the pair of part cylindrical outer surfaces extending further from the inner surface of the bearing cap than the outer surfaces thereof, said body being provided with a cavity therein and openings communicating with the cavity positioned adjacent to each of the part cylindrical outer surfaces of the bearing cap, a reservoir positioned below the orifice in the bottom of the housing and in communication with the orifice, a body of liquid lubricant only partially filling the reservoir, a pump having an inlet connected to the reservoir and an outlet, means defining a first passage communicating with the outlet of the pump and the bearing surface for delivering liquid lubricant to the bearing surface at a first high pressure, and means defining a second passage communicating with the outlet of the pump and the cavity of the body including a flow restricting orifice for delivering liquid lubricant to the cavity at a lower second pressure, the area of the flow restricting orifice being less than the area in the opening in the body so that liquid lubricant flows from the opening at a third and lowest pressure.

6. A bearing structure for a shaft adapted to rotate at high rotation rates comprising a housing having a bottom and a wall extending upwardly therefrom, the bottom having an orifice therein and the wall being constructed of material having the thermal conductivity of a metal and having a semicylindrical surface therein, a bearing cap constructed of material having the thermal conductivity of a metal mounted on the wall confronting the semicylindrical surface of the wall, said bearing cap having a semicylindrical inner surface confronting the semicylindrical surface of the wall and forming therewith a cylindrical bearing surface, said bearing cap having a surface normal to the axis of the bearing surface disposed on the same plane as one of the surfaces of the wall, said bearing cap also having a pair of part cylindrical outer surfaces extending upwardly from the wall, said bearing cap having a body disposed between the pair of cylindrical outer surfaces extending further from the inner surface of the bearing cap than the outer surfaces thereof, said body being provided with a cavity therein and an opening communicating with the cavity positioned adjacent to each of the part cylindrical outer surfaces of the bearing cap, said bearing surface being journaled about the shaft, a ring mounted on the surfaces of the bearing cap and wall disposed in a common plane, said ring being coaxial with the bearing surface and snugly and rotatably disposed about the shaft, a reservoir positioned below the orifice in the bottom of the housing and in communication with the orifice, a body of liquid lubricant only partially filling the reservoir, and a pump having an inlet disposed within the reservoir and an outlet, means defining a first passage communicating with the outlet of the pump and the bearing surface for delivering liquid lubricant to the bearing surface at a first high pressure, and means defining a second passage communicating with the outlet of the pump and the cavity of the body including a flow restricting orifice for delivering liquid lubricant to the cavity at a lower second pressure, the area of the flow restricting orifice being less than the area in the opening in the body so that liquid lubricant flows from the opening at a third and lowest pressure.

7. A one-way clutch coupler adapted to operate at high rotation rates comprising a housing having a bottom and a pair of parallel walls extending upwardly therefrom, the bottom having an orifice therein and the walls being constructed of material having the thermal conductivity of metals, each of said walls having a part cylindrical surface therein and said surfaces being on a common axis, a bearing cap constructed of material having the thermal conductivity of a metal mounted on each of the walls confronting the part cylindrical surface of said wall, each of said bearing caps having a part cylindrical inner surface confronting the part cylindrical surface of the confronting wall and forming therewith a cylindrical bearing surface, said bearing caps also having an outer surface sloping upwardly from the confronting wall, each of said bearing caps having a body disposed more remote from the confronting wall than the sloping surface of said bearing cap, each of said bodies being provided with a cavity therein and an opening communicating with the cavity positioned adjacent to the sloping surface of said bearing cap, a first shaft journaled within the bearing surface of one of said walls and confronting the bearing cap thereof, a second shaft journaled within the bearing surface of the other of said walls and confronting the bearing cap thereof, a one-way clutch having a cylindrical inner race mounted coaxially on the first shaft and a cylindrical outer race mounted coaxially on the second shaft, said one-way clutch having a plurality of driving elements disposed between the inner and outer race in communication with the atmosphere within the housing, a reservoir adapted to be positioned below the orifice in the bottom of the housing and in communication with the orifice, a body of liquid lubricant only partially filling the reservoir, a pump having an inlet connected to the reservoir and an outlet, means defining a first passage communicating with the outlet of the pump and the bearing surfaces for delivering a liquid lubricant to the bearing surfaces at a first high pressure, and means defining a second passage communicating with the outlet of the pump and the cavity of the bodies including a flow restricting orifice for delivering liquid lubricant to the cavity at a lower second pressure, the area of the flow restricting orifice being less than the area in the opening in the body so that liquid lubricant flows from the opening at a third and lowest pressure.

8. A one-way clutch coupler comprising the elements of claim 7 wherein each of the bearing caps is provided with flat surfaces normal to the axis of the bearing surface which are disposed in the same planes as the surfaces of the confronting wall, and the said surface of each of the bearing caps remote from the one-way clutch has mounted thereon a ring coaxial with the bearing surface, the ring on the one wall snugly and rotatably engaging the first shaft and the ring on the other wall snugly and rotatably engaging the second shaft.

9. A one-way clutch coupler adapted to operate at high rotation rates comprising a housing having a bottom and a pair of parallel walls extending upwardly therefrom, the bottom having an orifice therein and the walls being constructed of material having the thermal conductivity of metals, each of said walls having a part cylindrical surface therein and said surfaces being on a common axis, a bearing cap constructed of material having the thermal conductivity of a metal mounted on each of the walls confronting the part cylindrical surface of said wall, each of said bearing caps having a part cylindrical inner surface confronting the part cylindrical surface of the confronting wall and forming therewith a cylindrical bearing surface, said bearing caps also having an outer surface sloping upwardly from the confronting wall, each of said bearing caps having a body disposed more remote from the confronting wall than the sloping surface of said bearing cap, each of said bodies being provided with a cavity therein and an opening communicating with the cavity positioned adjacent to the sloping surface of said bearing cap, a first shaft journaled within the bearing surface of one of said walls and confronting the bearing cap, a second shaft journaled within the bearing surface of the other of said walls and confronting the bearing cap, a one-way clutch having a cylindrical inner race mounted coaxially on the first shaft and a cylindrical outer race mounted coaxially on the second shaft, the inner race of said clutch having a plurality of spaced indentations defining inclined planes parallel to the axis of the race, said one-way clutch having a roller disposed in each indentation between the inner and outer race, rotation of the inner race relative to the outer race wedging the rollers between the inner and outer races, and rotation of the inner and outer races in the opposite direction freeing the rollers for rotation in the indentations, said clutch having an opening between the inner and outer race permitting lubricant vapor and drops to impinge upon the rollers and the confronting surfaces of the inner and outer races, a reservoir positioned below the orifice in the bottom of the housing and in communication with the orifice, a body of liquid lubricant only partially filling the reservoir, a pump having an inlet connected to the reservoir and an outlet, means defining a first passage communicating with the outlet of the pump and the bearing surfaces for delivering liquid lubricant to the bearing surfaces at a first high pressure, and means defining a second passage communicating with the outlet of the pump and the cavity of the bodies including a flow restricting orifice for delivering liquid lubricant to the cavities at a lower second pressure, the area of the flow restricting orifice being less than the area in the opening in the body so that liquid lubricant flows from the openings at a third and lowest pressure.

10. A one-way clutch coupler comprising the elements of claim 9 wherein the means defining a first passage between the pump and the bearing surfaces comprises a pipe extending normally through the pair of walls between the bottom and the bearing surfaces, and a bore disposed within each of the walls extending from the pipe to the bearing surface of said wall.

11. A one-way clutch coupler comprising the elements of claim 10 wherein the means defining the second passage communicating with the inlet of the pump and the cavity of one of the bodies comprises a tube sealed at one end into an opening in the pipe and at the other end into an aperture in the body of said bearing cap.

References Cited by the Examiner

UNITED STATES PATENTS

| | | | |
|---|---|---|---|
| 1,728,268 | 9/29 | Flanders | 308—76 |
| 2,175,876 | 10/39 | Chilton. | |
| 2,606,796 | 8/52 | Helms | 308—127 X |

FOREIGN PATENTS

| | | |
|---|---|---|
| 400,159 | 1/32 | Great Britain. |

DAVID J. WILLIAMOWSKY, *Primary Examiner.*

FRANK SUSKO, *Examiner.*